United States Patent
Cai et al.

(10) Patent No.: US 9,544,355 B2
(45) Date of Patent: Jan. 10, 2017

(54) METHODS AND APPARATUS FOR REALIZING SHORT URL SERVICE

(71) Applicant: Tencent Technology (Shenzhen) Company Limited, Shenzhen (CN)

(72) Inventors: Xiaopeng Cai, Shenzhen (CN); Wu Hu, Shenzhen (CN); Jiewen Lin, Shenzhen (CN); Xiongfeng Zhu, Shenzhen (CN); Qunming Ouyang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/142,939

(22) Filed: Apr. 29, 2016

(65) Prior Publication Data

US 2016/0248837 A1    Aug. 25, 2016

Related U.S. Application Data

(63) Continuation of application No. PCT/CN2014/089751, filed on Oct. 29, 2014.

(30) Foreign Application Priority Data

Oct. 30, 2013 (CN) .......................... 2013 1 0528793

(51) Int. Cl.
*G06F 15/173* (2006.01)
*H04L 29/08* (2006.01)

(52) U.S. Cl.
CPC ............... *H04L 67/02* (2013.01); *H04L 67/26* (2013.01)

(58) Field of Classification Search
CPC ................................ H04L 67/02; H04L 67/26
See application file for complete search history.

(56) References Cited

U.S. PATENT DOCUMENTS

| 8,190,711 B1 * | 5/2012 | Borodich .......... G06F 17/30876 705/20 |
| 2004/0248558 A1 * | 12/2004 | Chandhok ......... H04L 29/12594 455/412.1 |

(Continued)

FOREIGN PATENT DOCUMENTS

| CN | 102033926 A | 4/2011 |
| CN | 102402558 A | 4/2012 |

(Continued)

OTHER PUBLICATIONS

"Frequently Asked Questions About Tiny" (https://web.archive.org/web/20121222090724/http://tiny.cc/help), Dec. 22, 2012, Tiny.cc, pp. 1-3.*

(Continued)

*Primary Examiner* — Jonathan Bui
(74) *Attorney, Agent, or Firm* — Morgan, Lewis & Bockius LLP (57) ABSTRACT

Methods and apparatus for realizing a short URL service are provided. According to a long URL, a short URL and long URL information are generated and stored. The long URL information contains the long URL and an information ID, and the information ID corresponds to the short URL via a pre-set corresponding mechanism to provide a corresponding relationship there-between. When a target long URL is acquired based on the short URL, the long URL in the long URL information is obtained as the target long URL according to the corresponding relationship between the short URL and the information ID. The target long URL obtained (Continued)

according to the short URL is updated by updating the long URL in the long URL information.

12 Claims, 4 Drawing Sheets

(56) References Cited

U.S. PATENT DOCUMENTS

| | | | |
|---|---|---|---|
| 2011/0295990 A1* | 12/2011 | St. Jean | G06F 17/30887 |
| | | | 709/223 |
| 2012/0102087 A1* | 4/2012 | Chor | H04L 67/02 |
| | | | 709/202 |
| 2012/0316941 A1* | 12/2012 | Moshfeghi | G06Q 30/02 |
| | | | 705/14.16 |
| 2014/0122567 A1* | 5/2014 | Suryavanshi | G06F 17/30887 |
| | | | 709/203 |
| 2015/0161282 A1* | 6/2015 | Low | G06F 17/30887 |
| | | | 709/203 |

FOREIGN PATENT DOCUMENTS

| | | |
|---|---|---|
| TW | 1353146 B | 11/2011 |
| TW | 1376138 B | 11/2012 |
| TW | 1379209 B | 12/2012 |
| TW | 1380663 B | 12/2012 |

OTHER PUBLICATIONS

Tencent Technology, ISRWO, PCT/CN2014/089751, Feb. 17, 2015, 6 pgs.
Tencent Technology, IPRP, PCT/CN2014/089751, May 3, 2016, 4 pgs.

\* cited by examiner

METHODS AND APPARATUS FOR REALIZING SHORT URL SERVICE

CROSS-REFERENCES TO RELATED APPLICATIONS

This application is a continuation application of PCT Patent Application No. PCT/CN2014/089751, entitled "METHODS AND APPARATUS FOR REALIZING SHORT URL SERVICE" filed on Oct. 29, 2014, which claims priority to Chinese Patent Application No. 201310528793.X, entitled "METHODS AND APPARATUS FOR REALIZING SHORT URL SERVICE" filed on Oct. 30, 2013, both of which are incorporated herein by reference in their entirety.

FIELD OF THE DISCLOSURE

The present disclosure generally relates to the field of Internet technology and, more particularly, relates to methods and apparatus for realizing a short URL service.

BACKGROUND

Uniform Resource Locator (URL) or a website address is a standard internet resource address. A general form of URL can be: <URL accessing method>://<host computer>:<port>/<path>, for example, https://mail.qq.com/cgi-bin/loginpage, which provides a webpage for login of QQ emails.

A whole URL often contains a large amount of characters. It is less convenient to use and spread the whole URL, especially in an environment requiring limited word counts. For example, microblog requires a limited word count of 140 words or less. Citing the whole URL may occupy a great length. Short URL services are desired and have been promoted.

The short URL service is also called short website address service. Conventional long URLs having large amount of characters may be converted into short URLs with less amount of characters according to a pre-set algorithm. For example, a long URL for accessing QQ email box can be https://mail.qq.com/cgi-bin/loginpage, which is converted by a short URL service to provide a short URL: http://url.cn/2GmfZ3. Thus, when the user inputs a conventional long URL into QQ microblog, corresponding short URL with less character can be displayed on the microblog. The short URL occupies less word count and is suitable for use in an environment with limited word counts.

Currently, when using a short URL service to convert a long URL into a short URL, the converted short URL can only correspond to the original long URL. Once the original long URL has been changed for any possible reasons, the short URL is useless and cannot be used to refer back to information related to the original long URL. Resources are thus wasted.

BRIEF SUMMARY OF THE DISCLOSURE

One aspect or embodiment of the present disclosure includes a method for realizing a short URL service. A short URL and long URL information are generated and stored according to a long URL. The long URL information contains the long URL and an information ID, and the information ID corresponds to the short URL via a pre-set corresponding mechanism to provide a corresponding relationship there-between. When a target long URL is acquired based on the short URL, the long URL in the long URL information is obtained as the target long URL according to the corresponding relationship between the short URL and the information ID. The target long URL obtained according to the short URL is updated by updating the long URL in the long URL information.

Another aspect or embodiment of the present disclosure includes an apparatus for realizing a short URL service. The apparatus includes a short URL obtaining unit, a long URL obtaining unit, and a long URL updating unit. The short URL obtaining unit is configured to generate and store a short URL and long URL information from a long URL. The long URL information contains a long URL and an information ID, and the information ID corresponds to the short URL via a pre-set corresponding mechanism to provide a corresponding relationship there-between. The long URL obtaining unit is configured, when a target long URL is acquired based on the short URL, to obtain the long URL in the long URL information as the target long URL according to the corresponding relationship between the short URL and the information ID. The long URL updating unit is configured to update the target long URL obtained according to the short URL by updating the long URL in the long URL information.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-7 depict exemplary methods and apparatus for realizing a short URL service. The disclosed methods and apparatus can allow a same short URL to dynamically jump to different long URL(s).

Figure 1:
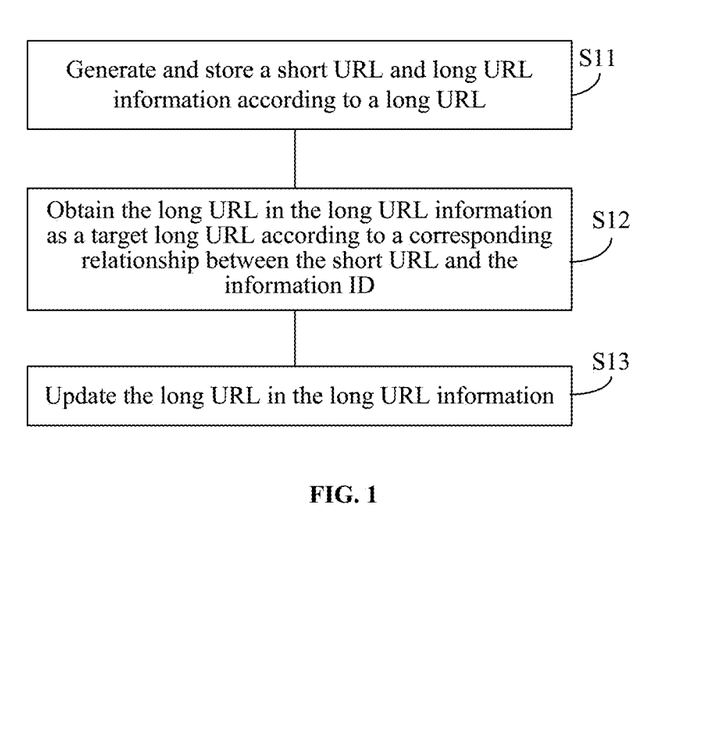
FIG. 1 depicts an exemplary method for realizing a short URL service consistent with various disclosed embodiments.

FIG. 1 depicts an exemplary method for realizing a short URL service consistent with various disclosed embodiments.

In Step S11 a short URL and long URL information are generated and stored according to a long URL. The long URL information contains the long URL and an information ID and the information ID corresponds to a short URL via a pre-set corresponding mechanism.

Figure 6:
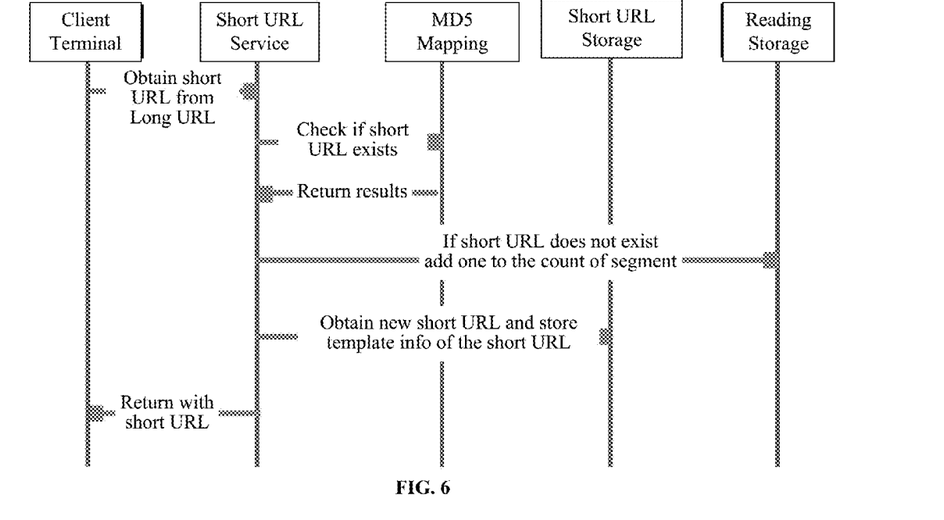
FIG. 6 depicts an exemplary sequence chart for generating a short URL consistent with the disclosed embodiments.

In various embodiments, the short URL and long URL information generated from the long URL can be respectively or separately stored. For example, for a long URL "http://user.qzone.qq.com/2804326697?ptlang=2052", to reduce the character amount occupied by the long URL to facilitate use and spread of the long URL, a certain generating mechanism can be used for the long URL to generate a short URL "http://url.cn/MTYLi8" having less character amount. For example, a mapping relationship between a long URL and a short URL can be formed by MD5 algorithm. As such, according to the long URL character string, corresponding short URL character string can be obtained using the pre-set MD5 algorithm (e.g., as also shown in FIG. 6). As the short URL character string can be hex (62-system), the long URL character string can be recorded by the short URL character string to effectively reduce the character amount occupied by the character string of the short URL. It is noted that, the methods for generating short URL according to long URL are not limited, and any suitable methods can be encompassed within the present disclosure.

In Step S12, when a target long URL is acquired based on the short URL, the long URL in the long URL information is obtained as the target long URL according to the corresponding relationship between the short URL and the information ID.

After the short URL is generated, the short URL and the long URL information are respectively stored. The long URL information contains a long URL and an information ID and the information ID is configured to identify the long URL. After the information ID is corresponded to the short URL, the corresponding long URL can be obtained through the short URL. For example, when the stored short URL is "http://url.cn/MTYLi8", the stored long URL information can be "0001: http://user.qzone.qq.com/2804326697?ptlang=2052", within which "0001" is the information ID. After associating the short URL http://url.cn/MTYLi8 with "0001", when accessing the short URL, the user can obtain corresponding long URL as a target long URL to have the accessed URL jumped to the long URL "http://user.qzone.qq.com/2804326697?ptlang=2052".

In Step S13, the target long URL obtained according to the short URL is updated by updating the long URL in the long URL information.

In practical applications, the target long URL needs to be updated for convenience of managing or for providing the user to jump to the latest target long URL. For example, when the target long URL http://user.qzone.qq.com/2804326697?ptlang=2052 jumped to according to the short URL "http://url.cn/MTYLi8" needs to be updated into a new long URL "http://user.qzone.qq.com/11111111111?ptlang=2052", the long URL in the URL information can be correspondingly modified. As the information ID of the long URL information has not been changed, when accessing the short URL, the user can obtain the corresponding updated target long URL http://user.qzone.qq.com/11111111111?ptlang=2052 to have the accessed website jumped to http://user.qzone.qq.com/11111111111?ptlang=2052. In other words, the disclosed methods can allow a short URL to dynamically jump to a desired, different long URL.

As disclosed, after correspondingly associating the generated short URL and the long URL, the short URL and the long URL are respectively stored. By updating the stored long URL, the accessed website can dynamic jump to the updated long URL. Such updating, in combination with the corresponding relationship between the short URL and the information ID, can allow a same short URL to jump to different long URL(s), which facilitates the jumping modification for the short URL to jump to target long URL.

Figure 2:
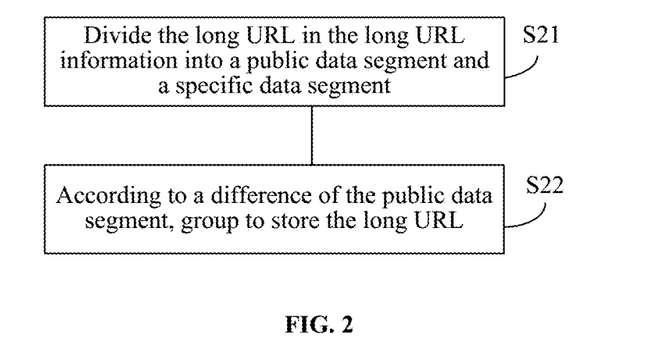
FIG. 2 depicts an exemplary method for storing long URL information consistent with various disclosed embodiments.

FIG. 2 depicts an exemplary method for storing long URL information consistent with various disclosed embodiments.

In Step S21, the long URL in the long URL information is pre-divided into a public data segment and a specific data segment. The public data segment includes a common data portion of multiple similar long URLs, and the specific data segment includes a distinguished data portion of the multiple similar long URLs.

In practical applications, the plurality of similar long URLs can contain a common data portion. For example, a long URL for a QQ-zone of all users can contain character string "http://user.qzone.qq.com/", which are the common data portion of these similar long URLs and can be called as public data segment. In addition, these similar long URLs can further contain the distinguished data portion distinguished from one another. For example, the data segment "2804326697?ptlang=2052" of the QQ-zone long URL "http://user.qzone.qq.com/11111111111?ptlang=2052" can be configured to identify each user QQ-zone address according to the difference of QQ numbers of users. The distinguished data portion of these similar long URLs can be called as specific data segment.

In Step S22, when storing the long URL information, according to a difference of the public data segment, the long URL is grouped and stored. The specific data segment of the long URL is stored into a data group corresponding to the public data segment of the long URL.

After dividing the long URL in the long URL information into a public data segment and a specific data segment, it can be found that a large amount of repeated data exists when storing each entire long URL. In this case, the same public data segment in all long URLs is repeatedly stored. In contrast, as disclosed herein, when storing the long URL information, the long URLs having a same public data segment are grouped into one group. The public data segment is therefore only stored for one time. In addition, the public data segment is used as the group ID. Public data segment in other long URLs containing the same public data segment can then be stored into this group having the group ID. In this manner, repeated storing process for same public data segment can be avoided to effectively save the storing space.

For example, when storing multiple long URLs including http://user.qzone.qq.com/0000000001, http://user.qzone.qq.com/0000000002, . . . http://user.qzone.qq.com/11111111111 having a public data segment of http://user.qzone.qq.com/, all of these long URLs having the same public data segment can be stored in one group. In this one group, only "0000000001", "0000000002" . . . "11111111111" (e.g., as specific data segment for each long URL) need to be stored to identify each of the long URL. For example, the public data segment can be used as an ID to distinguish each group and to facilitate formation of an entire long URL by obtaining the group ID in combination with corresponding specific data segment.

In another embodiment, when grouping long URLs according to a different public data segment for storage, the long URL in the long URL information can be modified by the following exemplary process.

To update the long URL in the long URL information, the public data segment and/or the specific data segment can be updated. Specifically, when the long URL in the long URL information needs to be updated, as the long URLs are grouped and divided into segments for storage, the public data segment and the specific data segment can be individually modified. For example, by modifying the specific data segment, a target long URL jumped according to a short URL can be changed. In an example when a group having a public data segment of "http://user.qzone.qq.com/" contains a specific data segment "0000000002", the specific data segment can be modified or updated as "2000000002". When to obtain the long URL according to original short URL, the new long URL "http://user.qzone.qq.com/2000000002" can be obtained as target long URL. Website access by dynamic jumping from the short URL can thus be realized.

In addition, the long URL in the long URL information can be batch updated by updating the common public data segment. For example, when a group having a public data segment "http://user.qzone.qq.com/" contains multiple specific data segments, the public data segment can be modified as http://user.q.qq.com/. When original short URLs (generated according to the long URLs having the public data segment http://user.qzone.qq.com/) are used to obtain long URLs (as target long URLs), the new target long URL formed by the updated public data segment "http://user.q-zone.qq.com/" in combination with corresponding specific data segments can then be obtained. For example, a group having an original public data segment http://user.qzone.qq.com/ may contain specific data segments "0000000001", "0000000002", . . . "1111111111". Before updating the public data segment, the short URL service can use the short URL to obtain a target long URL of "http://user.qzone.qq.com/0000000001", "http://user.qzone.qq.com/0000000002", http://user.qzone.qq.com/1111111111. However, after updating of the original public data segment as http://user.q.qq.com/, while still using original short URL, the target long URL obtained by the short URL can be updated as "http://user.q.qq.com/0000000001", "http://user.q.qq.com/0000000002", http://user.q.qq.com/1111111111. In this manner, by modifying/updating the public data segment, all target long URLs, formed by the modified public data segment and all specific data segments in the group identified by the public data segment, can be realized. This can effectively improve the updating efficiency of long URLs in the URL information. The disclosed method can ensure that all long URLs are modified in the group without omission. Updating accuracy of the URLs can thus be improved.

In another embodiment, the long URL information can further contain user data and/or product data. The user data can contain user ID data and/or user behavior data configured to record a user corresponding to the long URL. The product data can contain set-object data recorded for a set-object in a webpage corresponding to the long URL.

In one embodiment, to process statistics and analysis to the service condition of user accessing URL, the long URL information can further contain and store some of user data and/or product data of corresponding websites when generating the short URL. The service condition or use situation regarding user accessing URL can be obtained by processing statistics and analysis on user data and/or product data. The user data can contain user ID data and/or user behavior data configured to record a user corresponding to the long URL. A generating time for generating the short URL and/or an obtaining time for obtaining the target long URL according to the short URL can be obtained. Corresponding information regarding who (which user) and/or when accesses the set website can then be obtained. In addition, the product data can contain set-object data configured to record a set-object in a webpage corresponding to the long URL. The times or frequencies of accessing the set website object can be obtained. For example, on a website for selling a certain product, this product is considered as the set-object in the corresponding website.

In addition, in order to conveniently provide the data of statistics and analysis to a third party user, specific data from the long URL information can be obtained according to a pre-set obtaining mechanism. The obtained specific data can be pushed to a data receiver via a pre-set interface. The set obtaining mechanism can determine data type required by the URL information. After setting the obtaining mechanism according to the third party user requirement, the specific data of the long URL can be obtained via the pre-set interface, so it is convenient for behavior statistics and analysis by the third party user to the website accessing user.

Figure 3:
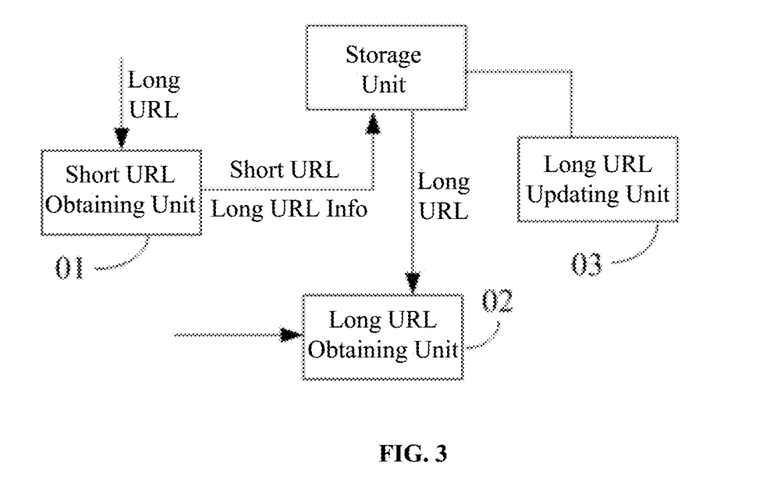
FIG. 3 depicts an exemplary apparatus for realizing a short URL service consistent with various disclosed embodiments.

In various embodiments, an apparatus for realizing a short URL service is provided. FIG. 3 depicts an exemplary apparatus for realizing a short URL service consistent with various disclosed embodiments. The exemplary apparatus can include short URL obtaining unit 01, long URL obtaining unit 02, and/or long URL updating unit 03.

The short URL obtaining unit 01 is configured to generate and store a short URL and long URL information according to a long URL. The long URL information contains the long URL and information ID. The information ID corresponds to the short URL via a pre-set corresponding mechanism.

The long URL obtaining unit 02 is configured, when a target long URL is obtained according to the short URL, to obtain the long URL corresponding to the long URL information, according to the corresponding relationship between the short URL and the information ID.

The long URL updating unit 03 is configured to update the target long URL obtained according to the short URL by updating the long URL in the long URL information.

For example, for a long URL "http://user.qzone.qq.com/2804326697?ptlang=2052", to reduce the character amount occupied by the long URL to facilitate use and spread of the URL, a certain generating mechanism can be used for the long URL to generate a short URL "http://url.cn/MTYLi8" having less character amount. For example, a mapping relationship between a long URL and a short URL can be formed by MD5 algorithm. As such, according to the long URL character string, corresponding short URL character string can be obtained using the pre-set MD5 algorithm. As the short URL character string can be hex (62-system), the long URL character string can be recorded by the short URL character string to effectively reduce the character amount occupied by the character string of the short URL. It is noted that, the methods for generating short URL according to long URL are not limited in any ways, and any suitable methods can be encompassed within the present disclosure.

After the short URL is generated by the short URL obtaining unit 01, the short URL and the long URL information are respectively stored in the storing unit as shown in FIG. 3. The long URL information contains a long URL and an information ID and the information ID is configured to identify the long URL. After the information ID is corresponded to the short URL, the corresponding long URL can be obtained through the short URL by the long URL obtaining unit 02. For example, when the stored short URL is "http://url.cn/MTYLi8", the stored long URL information can be "0001: http://user.qzone.qq.com/2804326697?ptlang=2052", within which "0001" is the information ID. After associating the short URL http://url.cn/MTYLi8 with "0001", when accessing the short URL, the long URL obtaining unit 02 can obtain the corresponding long URL as a target long URL to have the accessed URL jumped to the long URL "http://user.qzone.qq.com/2804326697?ptlang=2052".

In practical applications, the target long URL needs to be updated for convenience of managing or for providing the user to jump to the latest target long URL. For example, when the target long URL http://user.qzone.qq.com/2804326697?ptlang=2052 jumped to according to the short URL "http://url.cn/MTYLi8" needs to be updated into a new long URL "http://user.qzone.qq.com/11111111111?ptlang=2052", the long URL in the URL information can be correspondingly modified by the long URL updating unit 03.

As the information ID of the long URL information has not been changed, when accessing the short URL, the user can obtain the corresponding updated target long URL http://user.qzone.qq.com/11111111111?ptlang=2052 to have the accessed website jumped to http://user.qzone.qq.com/11111111111?ptlang=2052. In other words, the disclosed methods can allow a short URL to dynamically jump to a desired, different long URL.

As disclosed, after correspondingly associating the generated short URL and the long URL, the short URL and the long URL are respectively stored by the short URL obtaining 01. By updating the stored long URL, the accessed website can dynamic jump to the updated long URL. Such updating, in combination with the corresponding relationship between the short URL and the information ID, can allow a same short URL to jump to different long URL(s), which facilitates the jumping modification for the short URL to jump to target long URL.

In addition, the short URL obtaining 01 includes a dividing module and a long-URL-information storing module.

The dividing module is configured to pre-divide the long URL in the long URL information to include a public data segment and a specific data segment. The public data segment includes a common data portion of multiple similar long URLs, and the specific data segment includes a distinguished data portion of the multiple similar long URLs.

The long-URL-information storing module is configured, according to a difference of the public data segment, to group to store the long URL, and to store the specific data segment of the long URL into a data group corresponding to the public data segment of the long URL.

In practical applications, the plurality of similar long URLs can contain a common data portion. For example, a long URL for a QQ-zone of all users can contain character string "http://user.qzone.qq.com/", which are the common data portion of these similar long URLs and can be called as public data segment. In addition, these similar long URLs can further contain the distinguished data portion distinguished from one another. For example, the data segment "2804326697?ptlang=2052" of the QQ-zone long URL "http://user.qzone.qq.com/11111111111?ptlang=2052" can be configured to identify each user QQ-zone address according to the difference of QQ numbers of users. The distinguished data portion of these similar long URLs can be called as specific data segment.

After dividing the long URL in the long URL information into a public data segment and a specific data segment by the dividing module, it can be found that a large amount of repeated data exists when storing each entire long URL. In this case, the same public data segment in all long URLs is repeatedly stored. In contrast, as disclosed herein, when storing the long URL information by the long-URL-information storing module, the long URLs having a same public data segment are grouped into one group. The public data segment is therefore only stored for one time. In addition, the public data segment is used as the group ID. Public data segment in other long URLs containing the same public data segment can then be stored into this group having the group ID. In this manner, repeated storing process for same public data segment can be avoided to effectively save the storing space.

For example, when storing multiple long URLs including http://user.qzone.qq.com/0000000001, http://user.qzone.qq.com/0000000002, http://user.qzone.qq.com/11111111111 having a public data segment of http://user.qzone.qq.com/, all of these long URLs having the same public data segment can be stored in one group. In this one group, only "0000000001", "0000000002" . . . "1111111111" (e.g., as specific data segment for each long URL) need to be stored to identify each of the long URL. For example, the public data segment can be used as an ID to distinguish each group and to facilitate formation of an entire long URL by obtaining the group ID in combination with corresponding specific data segment.

In another embodiment, when grouping long URLs according to a different public data segment for storage, the long URL updating unit 03 can include a data-segment updating module.

To update the long URL in the long URL information by the data-segment updating module, the public data segment and/or the specific data segment can be updated. Specifically, when the long URL in the long URL information needs to be updated, as the long URLs are grouped and divided into segments for storage, the public data segment and the specific data segment can be individually modified by the data-segment updating module. For example, by modifying the specific data segment by the data-segment updating module, a target long URL jumped according to a short URL can be changed. In an example when a group having a public data segment of "http://user.qzone.qq.com/" contains a specific data segment "0000000002", the specific data segment can be modified or updated as "2000000002". When to obtain the long URL according to original short URL, the new long URL "http://user.qzone.qq.com/2000000002" can be obtained as target long URL. Website access by dynamic jumping from the short URL can thus be realized.

In addition, the long URL in the long URL information can be batch updated by updating the common public data segment. For example, when a group having a public data segment "http://user.qzone.qq.com/" contains multiple specific data segments, the public data segment can be modified as http://user.q.qq.com/. When original short URLs (generated according to the long URLs having the public data segment http://user.qzone.qq.com/) are used to obtain long URLs (as target long URLs), the new target long URL formed by the updated public data segment "http://user.q-zone.qq.com/" in combination with corresponding specific data segments can then be obtained. For example, a group having an original public data segment http://user.qzone.qq.com/ may contain specific data segments "0000000001", "0000000002", . . . "1111111111". Before updating the public data segment, the short URL service can use the short URL to obtain a target long URL of "http://user.qzone.qq.com/0000000001", "http://user.qzone.qq.com/0000000002", http://user.qzone.qq.com/1111111111.

However, after updating of the original public data segment as http://user.q.qq.com/, while still using original short URL, the target long URL obtained by the short URL can be updated as "http://user.q.qq.com/0000000001", "http://user.q.qq.com/0000000002", http://user.q.qq.com/1111111111.

In this manner, by modifying/updating the public data segment, all target long URLs, formed by the modified public data segment and all specific data segments in the group identified by the public data segment, can be realized. This can effectively improve the updating efficiency of long URLs in the URL information. The disclosed method can ensure that all long URLs are modified in the group without omission. Updating accuracy of the URLs can thus be improved.

In another embodiment, the long URL information can further contain user data and/or product data. The user data can contain user ID data and/or user behavior data configured to record a user corresponding to the long URL. The product data can contain set-object data recorded for a set-object in a webpage corresponding to the long URL.

In one embodiment, to process statistics and analysis to the service condition of user accessing URL, the long URL information can further contain and store some of user data and/or product data of corresponding websites when generating the short URL. The service condition or use situation regarding user accessing URL can be obtained by processing statistics and analysis on user data and/or product data. The user data can contain user ID data and/or user behavior data configured to record a user corresponding to the long URL. A generating time for generating the short URL and/or an obtaining time for obtaining the target long URL according to the short URL can be obtained. Corresponding information regarding who (which user) and/or when accesses the set website can then be obtained. In addition, the product data can contain set-object data configured to record a set-object in a webpage corresponding to the long URL. The times or frequencies of accessing the set website object can be obtained. For example, on a website for selling a certain product, this product is considered as the set-object in the corresponding website.

In addition, in order to conveniently provide the data of statistics and analysis to a third party user, specific data from the long URL information can be obtained according to a pre-set obtaining mechanism. The obtained specific data can be pushed to a data receiver via a pre-set interface by a data pushing unit. The set obtaining mechanism can determine data type required by the URL information. After setting the obtaining mechanism according to the third party user requirement, the specific data of the long URL can be obtained via the pre-set interface, so it is convenient for behavior statistics and analysis by the third party user to the website accessing user.

Figure 4:
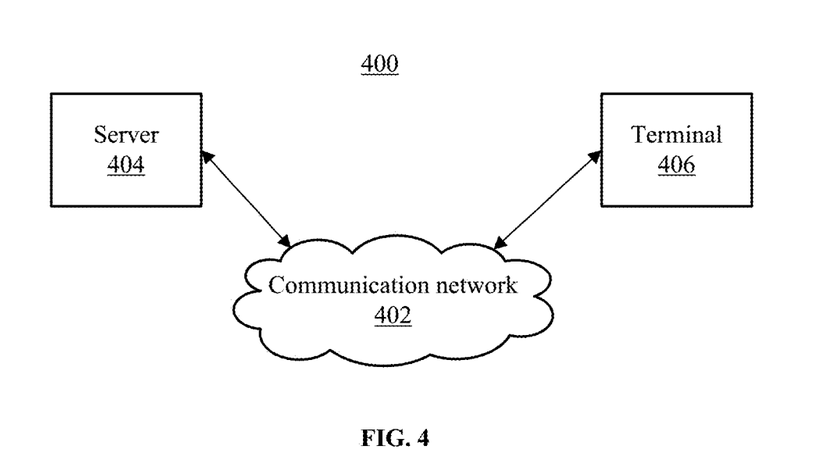
FIG. 4 depicts an exemplary environment incorporating certain disclosed embodiments.

FIG. 4 depicts an exemplary environment 400 incorporating certain disclosed embodiments. As shown in FIG. 4, environment 400 can include a server 404, a client 406, and a communication network 402. The server 404 and the client 406 may be coupled through the communication network 402 for information exchange, such as webpage browsing, Internet searching, data downloading, etc. Although only one client 406 and one server 404 is shown in the environment 400, any number of clients 406 or servers 404 may be included, and other devices may also be included.

Communication network 402 may include any appropriate type of communication network for providing network connections to the server 404 and client 406 or among multiple servers 404 or clients 406. For example, communication network 402 may include the Internet or other types of computer networks or telecommunication networks, either wired or wireless.

The client 406, as used herein, may refer to any appropriate client terminal and/or user terminal with certain computing capabilities. The client terminal can include a personal computer (PC), a work station computer, a server computer, a hand-held computing device (tablet), a smart phone or mobile phone, or any other user-side computing device. The server 404, as used herein, may refer one or more server computers configured to provide certain server functionalities, such as database management and search engines. The server may also include one or more processors to execute computer programs in parallel.

Figure 5:
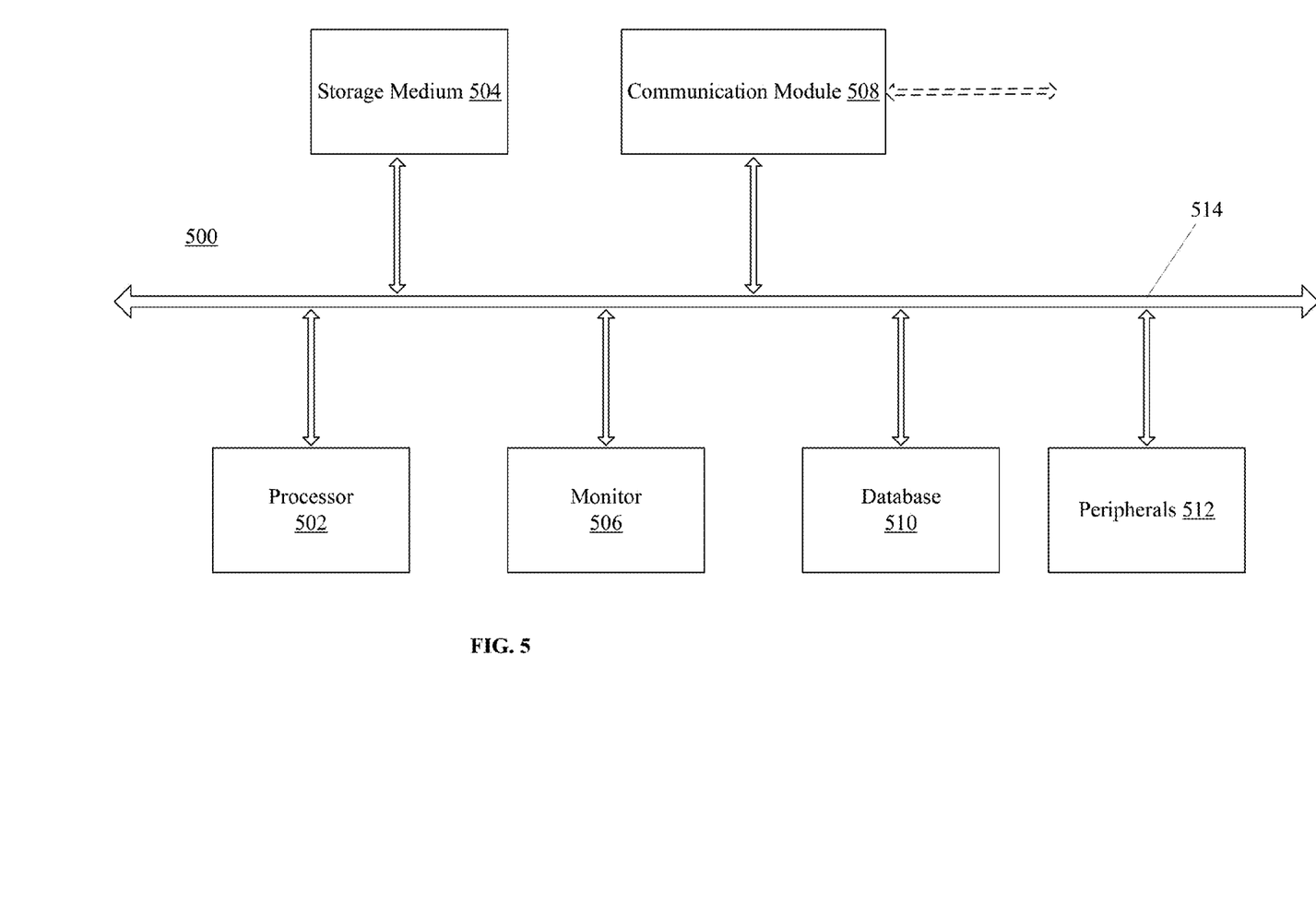
FIG. 5 depicts an exemplary computer system consistent with the disclosed embodiments.

The server 404 and the client 406 may be implemented on any appropriate computing platform. FIG. 5 shows a block diagram of an exemplary computer system 500 capable of implementing the server 404 and/or the client/terminal 406. As shown in FIG. 5, the exemplary computer system 500 may include a processor 502, a storage medium 504, a monitor 506, a communication module 508, a database 510, peripherals 512, and one or more bus 514 to couple the devices together. Certain devices may be omitted and other devices may be included.

Processor 502 can include any appropriate processor or processors. Further, processor 502 can include multiple cores for multi-thread or parallel processing. Storage medium 504 may include memory modules, such as ROM, RAM, and flash memory modules, and mass storages, such as CD-ROM, U-disk, removable hard disk, etc. Storage medium 504 may store computer programs for implementing various processes, when executed by processor 502.

Further, peripherals 512 may include I/O devices such as keyboard and mouse, and communication module 508 may include network devices for establishing connections through the communication network 402. Database 510 may include one or more databases for storing certain data and for performing certain operations on the stored data, such as webpage browsing, database searching, etc.

In operation, client 406 may cause server 404 to perform certain actions, such as Internet browsing, Internet search, or other database operations. Server 404 may be configured to provide structures and functions for such actions and operations. In one embodiment, the disclosed method for realizing the short URL service can be performed by an exemplary server, which can interact with a client terminal operated by a user. The disclosed apparatus for realizing the short URL service can be a portion of a server, or can include a server. In one embodiment, the present disclosure solves technical problems on server technology.

Generally, long URL is less convenient for spread and typography. Conventional short URLs cannot dynamically jump to a different long URL (only can be directed to the original long URL) and cannot realize individual and customized statistics. Conventional short URLs cannot carry UIN information and may have a fixed length. As disclosed, short URL can be generated from a long URL and a both-way mapping relationship between the long URL and the short URL can be maintained. An interface for inter-conversion between short and long URLs and a jumping service of the short URL can be provided. In addition, the long URL can be dynamically jumped to (e.g., once the long URL is updated, the updated URL can be immediately used) and/or processed by security checking. When necessary, a notification can be provided to the front desk. Further, the generated short URL is controlled not to contain sensitive keyword(s). The short URLs do not have any conflict but with extendable length.

In a certain embodiment, short URL switching or jumping to a long URL can be adjusted according to a template. For example, by modifying the template, URLs can be switched and accessed at any time as desired.

FIG. 6 depicts a sequence chart for generating a short URL. When generating the short URL, collisions of "short character string" can be avoided by grouping and a local-lock in the group. When establishing long URL with a template, parameters other than the template can be stored and used to restore the long URL. Similarly as for restoring a long URL, an extra data reporting module can be maintained. The data reporting module can be formed by the template plus customized parameters. For example, when storing, only customized parameters need to be stored.

UIN information is appended with short URL via a 6-byte and 62 system value. The appended UIN information cannot affect short URL parsing process. The length can be used to determine the UIN information. When the length of URL exceeds 9 bytes, the last 6 byte must be an UIN. The short URL appended with UIN information does not lead to storage expansion. Because the storage only stores basic portion of the short URL part, the UIN portion is realized by algorithm. In one embodiment, character set used in the short URL and the UIN information is 62-system. In one embodiment, the UIN information can correspond to the long URL information as disclosed herein.

Figure 7:
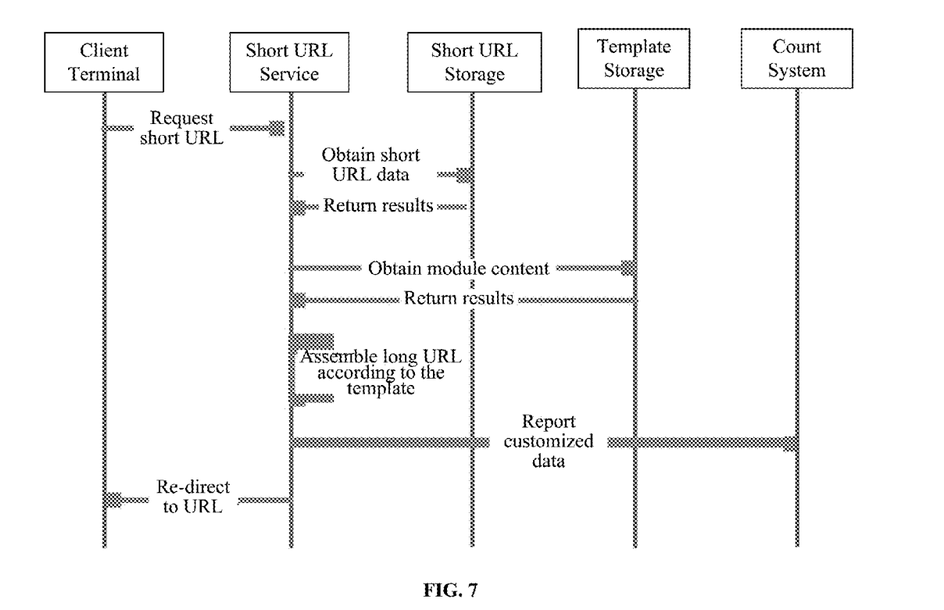
FIG. 7 depicts an exemplary sequence chart for reading a short URL consistent with the disclosed embodiments.

FIG. 7 depicts a sequence chart for reading a short URL. When a user access a short URL, long URL and/or template information (or UIN information or information ID) corresponding to the short URL can be searched. According to the template information, long URL can be assembled (or updated) and data can be reported. The data report can use a format and content customized by a third party system and may support UDP (User Datagram Protocol).

The disclosed method and apparatus can dynamically adjust URL to rapidly adjust direction of short URL during an operation. Customized/personalized statistics can be achieved. By using template count system including UIN information, statistic ability can be effectively provided. The contained UIN information can facilitate system reflux statistics and user behavior analysis. The length of the URL can be dynamically adjusted according to use capacity of the system and can vary between 1-6 bytes.

It should be understood that steps described in various methods of the present disclosure may be carried out in order as shown, or alternately, in a different order. Therefore, the order of the steps illustrated should not be construed as limiting the scope of the present disclosure. In addition, certain steps may be performed simultaneously.

The disclosed methods, apparatus, and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

As used herein, the term "module" or "unit" can be software objects executed on a computing system. A variety of components described herein including elements, modules, units, engines, and services can be executed in the computing system. The methods, apparatus, and/or systems can be implemented in a software manner. Of course, the methods, apparatus, and/or systems can be implemented using hardware. All of which are within the scope of the present disclosure.

A person of ordinary skill in the art can understand that the units/modules included herein are described according to their functional logic, but are not limited to the above descriptions as long as the units/modules can implement corresponding functions. Further, the specific name of each functional module is used to be distinguished from one another without limiting the protection scope of the present disclosure.

In various embodiments, the disclosed units/modules can be configured in one apparatus (e.g., a processing unit) or configured in multiple apparatus as desired. The units/modules disclosed herein can be integrated in one unit/module or in multiple units/modules. Each of the units/modules disclosed herein can be divided into one or more sub-units/modules, which can be recombined in any manner. In addition, the units/modules can be directly or indirectly coupled or otherwise communicated with each other, e.g., by suitable interfaces.

One of ordinary skill in the art would appreciate that suitable software and/or hardware (e.g., a universal hardware platform) may be included and used in the disclosed methods, apparatus, and/or systems. For example, the disclosed embodiments can be implemented by hardware only, which alternatively can be implemented by software products only. The software products can be stored in computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

For example, the disclosed methods can be implemented by an apparatus/device including one or more processor, and a non-transitory computer-readable storage medium having instructions stored thereon. The instructions can be executed by the one or more processors of the apparatus/device to perform the methods disclosed herein. In some cases, the instructions can include one or more modules corresponding to the disclosed methods.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND
ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods and apparatus for realizing a short URL service are provided. According to a long URL, a short URL and long URL information are generated and stored. The long URL information contains the long URL and an information ID, and the information ID corresponds to the short URL via a pre-set corresponding mechanism to provide a corresponding relationship there-between. When a target long URL is acquired based on the short URL, the long URL in the long URL information is obtained as the target long URL according to the corresponding relationship between the short URL and the information ID. The target long URL obtained according to the short URL is updated by updating the long URL in the long URL information.

After correspondingly associating the generated short URL and the long URL, the short URL and the long URL are respectively stored. By updating the stored long URL, the accessed website can dynamic jump to the updated long URL. Such update, in combination with the corresponding relationship between the short URL and the information ID, can allow a same short URL to jump to different long URL(s), which facilitates the jumping modification for the short URL to jump to target long URL.

REFERENCE SIGN LIST

Short URL obtaining unit 01
Long URL obtaining unit 02
Long URL updating unit 03
Environment 400
Communication network 402
Server 404
Terminal 406
Processor 502
Storage medium 504
Monitor 506
Communications 508
Database 510
Peripherals 512
Bus 514

What is claimed is:

1. A method for realizing a short URL service, comprising:
    generating and storing a short URL and long URL information from a long URL, wherein the long URL information contains the long URL and an information ID, and the information ID corresponds to the short URL via a pre-set corresponding mechanism to provide a corresponding relationship there-between;
    when a target long URL is acquired based on the short URL, obtaining the long URL in the long URL information as the target long URL according to the corresponding relationship between the short URL and the information ID; and
    updating the target long URL obtained according to the short URL by updating the long URL in the long URL information.

2. The method according to claim 1, wherein the step of storing the long URL information comprises:
    pre-dividing the long URL in the long URL information into a public data segment and a specific data segment, wherein the public data segment includes a common data portion of a plurality of similar long URLs, and the specific data segment includes a distinguished data portion of the plurality of similar long URLs; and
    according to a difference of the public data segment, grouping to store the long URL, and storing the specific data segment of the long URL into a data group corresponding to the public data segment of the long URL.

3. The method according to claim 2, wherein the step of updating the long URL in the long URL information comprises:
    updating one or more of the public data segment and the specific data segment to update the long URL in the long URL information.

4. The method according to claim 3, wherein:
    the long URL information further contains one or more of user data and product data;
    the user data contains one or more of user ID data and user behavior data configured to record a user corresponding to the long URL; and
    the product data contains set-object data recorded for a set-object in a webpage corresponding to the long URL.

5. The method according to claim 4, wherein the user behavior data comprises:
    one or more of a generating time for generating the short URL and an obtaining time for obtaining the target long URL according to the short URL.

6. The method according to claim 5, further comprising:
    obtaining specific data from the long URL information according to a pre-set obtaining mechanism, and
    pushing the obtained specific data to a data receiver via a pre-set interface.

7. A computer system for realizing a short URL service, comprising:
    one or more processors;
    memory; and
    a plurality of program units stored in the memory and executable by the one or more processors, the plurality of program units further including:
        a short URL obtaining unit, configured to generate and store a short URL and long URL information from a long URL, wherein the long URL information contains a long URL and an information ID, and the information ID corresponds to the short URL via a pre-set corresponding mechanism to provide a corresponding relationship there-between;
        a long URL obtaining unit configured, when a target long URL is acquired based on the short URL, to obtain the long URL in the long URL information as the target long URL according to the corresponding relationship between the short URL and the information ID; and
        a long URL updating unit, configured to update the target long URL obtained according to the short URL by updating the long URL in the long URL information.

8. The computer system according to claim 7, wherein the short URL obtaining unit comprises:
    a dividing module, configured to pre-divide the long URL in the long URL information into a public data segment and a specific data segment, wherein the public data segment includes a common data portion of a plurality of similar long URLs, and the specific data segment includes a distinguished data portion of the plurality of similar long URLs; and
    a long-URL-information storing module configured, according to a difference of the public data segment, to group to store the long URL, and to store the specific data segment of the long URL into a data group corresponding to the public data segment of the long URL.

9. The computer system according to claim 8, wherein the long URL updating unit comprises:
a data-segment updating module configured to update one or more of the public data segment and the specific data segment.

10. The computer system according to claim 9, wherein:
the long URL information further contains one or more of user data and product data;
the user data contains one or more of user ID data and user behavior data configured to record a user corresponding to the long URL; and
the product data contains set-object data recorded for a set-object in a webpage corresponding to the long URL.

11. The computer system according to claim 10, wherein the user behavior data comprises:
one or more of a generating time for generating the short URL and an obtaining time for obtaining the target long URL according to the short URL.

12. The computer system according to claim 11, wherein the plurality of program units further include:
a data pushing unit configured to push specific data obtained from the long URL information according to a pre-set obtaining mechanism to a data receiver via a pre-set interface.

* * * * *